(No Model.)
M. E. ZELLER.
HARNESS SADDLE.
No. 337,645. Patented Mar. 9, 1886.
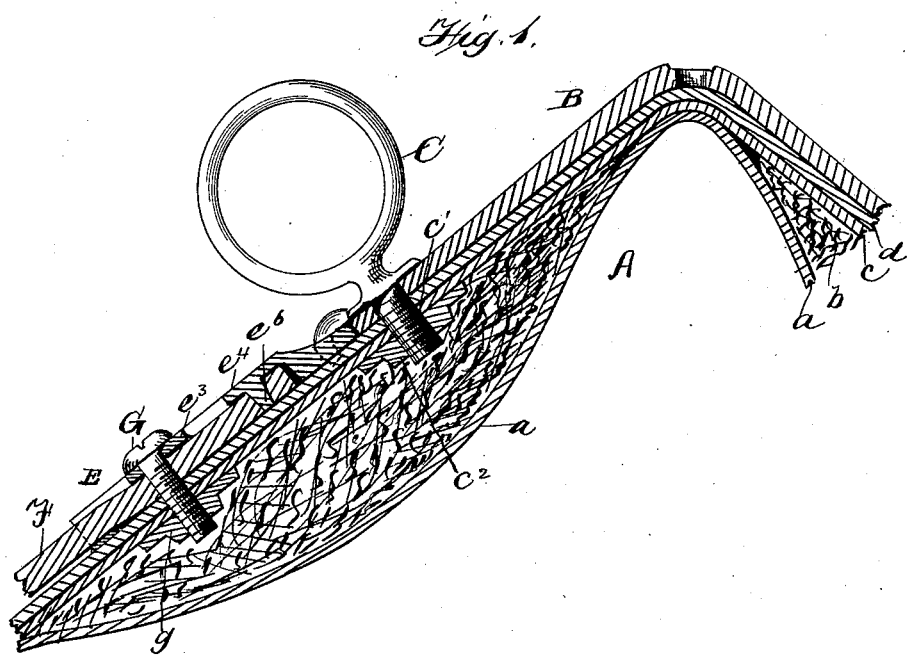
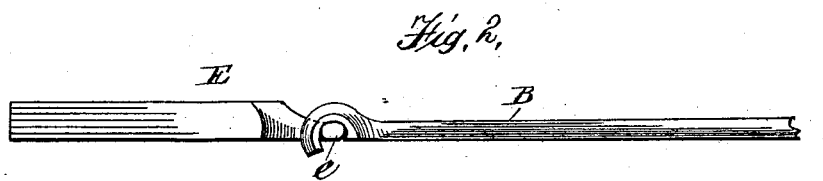
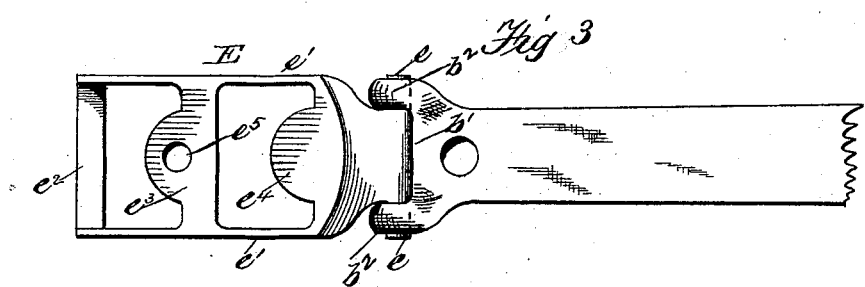
Attest:
W. H. H. Knight
S. O. Edmonds
Inventor:
Melancthon E. Zeller
per Edson Bros.
attys

United States Patent Office.

MELANCTHON E. ZELLER, OF BLUFFTON, OHIO, ASSIGNOR OF ONE-HALF TO A. J. ST. JOHN, OF SAME PLACE.

HARNESS-SADDLE.

SPECIFICATION forming part of Letters Patent No. 337,645, dated March 9, 1886.

Application filed November 11, 1885. Serial No. 182,399. (No model.)

*To all whom it may concern:*

Be it known that I, MELANCTHON E. ZELLER, a citizen of the United States, residing at Bluffton, in the county of Allen and State of Ohio, have invented certain new and useful Improvements in Saddle-Trees, of which the following is a specification, reference being had therein to the accompanying drawings.

My invention relates to saddle-trees for harness, and has for its object to provide a self-adjusting tree or yoke having direct connection with the pad-loops, and means whereby, in the event of either of the pad-screws becoming loosened or displaced, said loops will be retained in position, and will continue to hold the skirt straps in their proper place.

To this end the invention consists in the construction, arrangement, and combination of parts, substantially as hereinafter described, and specifically pointed out in the claims.

In the drawings, Figure 1 represents a sectional view taken through one side of a saddle-tree embodying my invention. Fig. 2 is a detached detail side elevation of a portion of the saddle-tree and its connected pad-loop. Fig. 3 represents a plan view of the parts shown in Fig. 2.

Referring to the drawings, in which like letters of reference denote like parts, A designates a saddle having the usual well-known configuration on its inner surface, $a$.

$b$ designates the filling, which may be of any ordinary material; $c$, the leather burr-piece, and $d$ the housing or outer covering of the saddle.

B designates the saddle-tree, having the usual terrets, C, the lower sides of which are provided with screw-threaded shanks $c'$, that are engaged by nuts $c^2$ upon the inner surface of the burr-piece $c$. The tree B is provided at its ends, at each side thereof, with hooks $b^2$, (see Fig. 3,) that engage with spurs $e$, projecting from each side of the pad-loops E at the upper ends thereof, said ends preferably filling the space $b'$ between the hooks $b^2$. (See Fig. 3.)

The pad-loops E, of which it will be understood there is one on each side, consist of the side bars, $e'$, and cross-bars $e^2$, $e^3$, and $e^4$. The bar $e^2$ is located at the free end of the loop, and extends from one to the other of the side bars, $e'$, at the bottom edges thereof, below the loop or skirt strap F. The cross-bars $e^2$ $e^3$ extend between the side bars at the top thereof, one of said bars—the middle one—$e^3$, having an aperture, $e^5$, through which the pad-screws G extend to a nut, $g$, within the burr-piece $c$. The remaining cross-bar $e^4$,—the upper one—is provided upon its inner surface with a projecting stud, $e^6$, that takes into an aperture formed in the upper end of the strap F. The pad-screw G passes through the strap F, and operates, in connection with the spur $e^6$ on the cross-bar $e^4$, to hold said strap in position.

It will be seen that the hinge-connection herein described, between the tree B and strap-loop E, serves to render the saddle flexible and capable of easy adaptation to the backs of different animals. It will also be apparent that, should the screw G become loosened or misplaced, the strap F will be held in position by the spur $e^5$. I attach importance to this latter described function of the spur $e^6$, whereby great trouble and annoyance consequent upon the loss of said screw G may be avoided.

Modifications in details of construction and arrangement of the different elements herein described as an embodiment of my invention may be made without departing from the spirit or sacrificing the advantages thereof—as, for instance, a spur may project upwardly from the cross-bar $e^2$ to engage apertures in the strap F.

I claim—

1. In a saddle, the combination of a tree having hooks at its lower end to engage the pad-loop, and apertures to receive terrets, with a pad-loop having laterally-projecting spurs to engage hooks upon the tree, an aperture to receive the pad-screw, and a downwardly-projecting spur to engage the skirt or loop strap, substantially as described.

2. In a saddle, the combination of the following-named elements: a tree, B, having hooks $b^2$ at its lower ends, terrets C, having screw-threaded shank $c'$, and nut $c^2$, pad-loop E, having laterally-projecting studs $e$, downwardly-projecting stud $e^6$, and aperture $e^5$, screw G, and nut $g$, with the housing $d$ and burr-piece $c$, substantially as described.

In testimony whereof I affix my signature in presence of two witnesses.

MELANCTHON E. ZELLER.

Witnesses:
 A. E. SWINEHART,
 J. S. EWING.